United States Patent
Peysokhan et al.

(10) Patent No.: US 10,739,229 B2
(45) Date of Patent: Aug. 11, 2020

(54) SYSTEMS AND METHODS FOR MEASURING ABSORPTION COEFFICIENTS OF DOPED OPTICAL FIBERS

(71) Applicant: STC.UNM, Albuquerque, NM (US)

(72) Inventors: Mostafa Peysokhan, Albuquerque, NM (US); Arash Mafi, Albuquerque, NM (US)

(*) Notice: Subject to any disclaimer, the term of this patent is extended or adjusted under 35 U.S.C. 154(b) by 0 days.

(21) Appl. No.: 16/522,449

(22) Filed: Jul. 25, 2019

(65) Prior Publication Data

US 2020/0033261 A1 Jan. 30, 2020

Related U.S. Application Data

(60) Provisional application No. 62/703,279, filed on Jul. 25, 2018.

(51) Int. Cl.
*G01M 11/00* (2006.01)

(52) U.S. Cl.
CPC ............ *G01M 11/35* (2013.01); *G01M 11/33* (2013.01)

(58) Field of Classification Search
CPC .......... G01N 21/47; G01N 2021/1744; G01N 2021/4735; G01M 11/30; G01M 11/31; G01M 11/33; G01M 11/332; G01M 11/333; G01M 11/334; G01M 11/335; G01M 11/35
USPC ........................................................ 356/73.1
See application file for complete search history.

(56) References Cited

U.S. PATENT DOCUMENTS

| | | | | |
|---|---|---|---|---|
| 4,183,666 A | * | 1/1980 | Tahara | G01M 11/33 356/432 |
| 4,304,489 A | * | 12/1981 | Wakabayashi | G01M 11/33 356/434 |
| 4,890,915 A | * | 1/1990 | Byvik | G01N 21/17 356/73 |
| 5,245,690 A | * | 9/1993 | Aida | H01S 3/13013 385/142 |
| 8,817,245 B2 | * | 8/2014 | Archambault | G01M 11/3145 356/73.1 |

(Continued)

OTHER PUBLICATIONS

DeCusatis, C. M. et al., "Fiber Optic Essentials", Elsevier Academic Press, 2006, 27 pages.

(Continued)

*Primary Examiner* — Gordon J Stock, Jr.
(74) *Attorney, Agent, or Firm* — MH2 Technology Law Group LLP

(57) ABSTRACT

A system for measuring an absorption coefficient of a doped optical fiber may include: a laser source configured to transmit laser light at a selectable wavelength; a single-mode optical fiber including an end configured to splice to the doped optical fiber; two or more multimode fibers at a side of the doped optical fiber, spaced apart along the side of the doped optical fiber, configured to collect spontaneous emissions from the side of the doped optical fiber; and/or a photodiode or power meter connected to the two or more multimode fibers. A method for measuring an absorption coefficient of a doped optical fiber may include: collecting, from a side of the doped optical fiber, an emission spectrum using two or more multimode fibers; and/or calculating the absorption coefficient form using the emission spectrum and McCumber theory.

20 Claims, 9 Drawing Sheets

(56) References Cited

U.S. PATENT DOCUMENTS

| | | | | |
|---|---|---|---|---|
| 8,860,934 | B2* | 10/2014 | Yablon | G01M 11/37 |
| | | | | 356/73.1 |
| 8,988,669 | B2* | 3/2015 | Liao | G01J 1/4257 |
| | | | | 356/73.1 |
| 2005/0074208 | A1* | 4/2005 | Badcock | G01J 1/4257 |
| | | | | 385/48 |
| 2005/0174563 | A1* | 8/2005 | Evans | H04B 10/071 |
| | | | | 356/73.1 |

OTHER PUBLICATIONS

Oh, M. et al., "Measurement of the Absorption Coefficient of Yb-Doped Fibers by a Side Light Analysis", New Physics: Sae Mulli, vol. 67, No. 4, Apr. 2017, pp. 499-503.

Peysokhan, M. et al., "Measuring the resonant absorption coefficient of rare-earth-doped optical fibers", Physics Optics, Oct. 15, 2018, 5 pages.

Peysokhan, M. et al., "A novel method for measuring the resonant absorption coefficient of rare-earth-doped optical fibers", Physics Optics, Feb. 8, 2019, 6 pages.

Peysokhan, M. et al., "Method for measuring the resonant absorption coefficient of rare-earth-doped optical fibers", Applied Optics, vol. 58, No. 7, Mar. 1, 2019, 6 pages.

Peysokhan, M. et al., "A non-destructive method for measuring the absorption coefficient of a doped optical fiber", Proceedings of SPIE 10936, Mar. 1, 2019, 8 pages.

\* cited by examiner

SYSTEMS AND METHODS FOR MEASURING ABSORPTION COEFFICIENTS OF DOPED OPTICAL FIBERS

CROSS-REFERENCE TO RELATED APPLICATION(S)

This application claims the benefit under 35 U.S.C. § 119(e) of provisional U.S. patent application No. 62/703,279, filed on Jul. 25, 2018, in the U.S. Patent and Trademark Office ("USPTO"), the entire contents of which are incorporated herein by reference.

GOVERNMENT SUPPORT

This disclosure was made with Government support under Contract No. FA9550-16-1-0362 awarded by the Air Force Office of Scientific Research ("AFOSR"). The U.S. Government has certain rights in the invention.

FIELD

The subject matter disclosed herein generally relates to optical fibers. The subject matter disclosed herein also relates to systems and methods for measuring absorption coefficients of doped optical fibers.

BACKGROUND

Fiber lasers are a prominent source of coherent light due to their capability to deliver high power output with good beam quality. Currently, fiber lasers are widely used in industry and scientific research fields. Since their early development, much research and study has concentrated on improving the output power, efficiency, reliability, and beam quality of fiber lasers. To achieve these goals, different wavelengths, materials, cavities, fiber structures, etc., have been implemented.

Total pump absorption plays a role in the overall efficiency of fiber lasers. Accordingly, an accurate measurement of the absorption coefficient is a factor in making fiber lasers more efficient. The absorption coefficient is dependent on the condition of the optical fiber and also its fabrication procedure. Even with the same production process, the absorption coefficient is not constant, hence companies report a wide range of values for the associated absorption coefficients.

FIG. 1 depicts an example of a cutback method according to the conventional art. The conventional cutback method has been widely used to measure the absorption coefficient of doped optical fibers. In this method, doped optical fiber 100 with doped core 102 and cladding 104 is pumped using a laser (not shown), and the pump power transmitted through doped core 102 is measured at points along the length of doped optical fiber 100.

As a first step in the conventional cutback method, doped optical fiber 100 is cut at the $1^{st}$ cut, as shown in FIG. 1. Then, doped optical fiber 100 is aligned with power meter 106, pumped using the laser, and the pump power transmitted through doped core 102 is measured at the $1^{st}$ cut using power meter 106.

As a second step in the conventional cutback method, doped optical fiber 100 is cut at the $2^{nd}$ cut, as shown in FIG. 1. Then, doped optical fiber 100 is realigned with power meter 106, pumped using the laser, and the pump power transmitted through doped core 102 is measured at the $2^{nd}$ cut using power meter 106.

As a third step in the conventional cutback method, doped optical fiber 100 is cut at the $3^{rd}$ cut, as shown in FIG. 1. Then, doped optical fiber 100 is realigned with power meter 106, pumped using the laser, and the pump power transmitted through doped core 102 is measured at the $3^{rd}$ cut using power meter 106.

This process of cutting, aligning/realigning, pumping, and measuring is repeated as required.

As can be observed by a person having ordinary skill in the art ("PHOSITA"), this method amounts to destructive testing of doped optical fiber 100. Thus, once the cutback method is performed on doped optical fiber 100, doped optical fiber 100—as tested—no longer exists to be used.

In addition, the cutting process involves cleaving, stripping, inspecting, polishing, and/or realigning the cut doped optical fiber 100. In particular, for best results, the cut doped optical fiber 100 should be precisely realigned relative to power meter 106 for each measurement, including locating the newly cut end at a same distance 'd' from power meter 106. As a result, the repeated realignments introduce error into the conventional cutback method.

Another source of error in the conventional cutback method is the presence of cladding modes. It is virtually impossible to eliminate all of the cladding modes in doped optical fiber 100.

One approach used to reduce the impact of the cladding modes is to cover cladding 104 with index matching gel. However, there are some cladding modes close to doped core 102 that remain unaffected by the index matching gel, and they can propagate through cladding 104, effectively having no interaction with doped core 102.

For passive optical fibers, it can be practical to use the cutback method for optical fibers on the order of a couple of kilometers in length, because the cladding modes can be greatly reduced or eliminated. However, doped optical fiber 100 is intrinsically an absorber, and so a typical length of doped optical fiber 100 used for the cutback method is on the order of one meter, thus the cladding modes cannot be greatly reduced or eliminated. Practically speaking, the presence of cladding modes in doped optical fiber 100 is an unavoidable source of error in measuring the absorption coefficient of doped optical fiber 100.

In the cutback method, all of the pump light should be coupled to doped core 102. Two options for such coupling include splicing with another optical fiber and using a microscope objective.

For the splicing option, it is typically difficult to find a commercially available passive fiber with a core diameter than matches the core diameter of doped core 102 because passive fibers are designed to lase at a lasing wavelength, but most of the time absorption at the pump wavelength is desirable for doped core 102. So a passive fiber should be chosen to carry the pump wavelength.

In one example, when splicing 980-XP (from Nufern, Inc., of East Granby, Conn.) as a passive fiber with SM-YSF-LO-HP (a ytterbium-doped, single-mode, single-clad optical fiber also from Nufern, Inc.) as a doped optical fiber, due to the fact that the mode field diameter at pumping wavelength is not the same in both fibers, the splicing loss is at least about 15%. This means that about 15% or more of the input power is gone, and some of that power couples to the cladding modes. But in an optical fiber length of less than one meter, it is almost impossible to completely remove all of that power from the cladding modes.

For the microscope-objective option, it may not be theoretically possible to couple all of the power into doped core 102. Additionally, it is typically difficult to find a commercially available, highly efficient microscope objective. This means that for the microscope-objective option, there is about 12% coupling loss, and some of that power couples to the cladding modes.

Further problems arise in the cutback method because some doped optical fibers 100, such as ZBLAN ($ZrF_4$—$BaF_2$—$LaF_3$—$AlF_3$—NaF), are mechanically fragile. But the cutback method requires significant handling, movement, and stress to doped optical fiber 100. Thus, handling ZBLAN fibers for the cutback method is extremely difficult.

For measuring the absorption coefficient in a highly doped fiber such as F-DF1100 (from Newport Corporation of Irvine, Calif.), which has a nominal peak absorption at 977 nm of 1,700 decibels per meter ("dB/m"), using the cutback method for the resonant wavelength (peak of absorption) is almost impossible because each piece should be smaller than a millimeter.

For applying the cutback method to certain optical fibers (e.g., ZBLAN fibers, large-mode-area fibers, photonic crystal fibers), because the cutting process involves cleaving, stripping, inspecting, polishing, and/or realigning, different tools may be required. In particular, proper cleaving (e.g., tension, cutting blade angle, straight and flat cleave) is challenging and time-consuming. In addition, ZBLAN fibers, large-mode-area fibers, and photonic crystal fibers are expensive and the cut pieces generally are not useful.

In view of these issues with the cutback method, a non-destructive and accurate method for measuring the absorption coefficient of doped optical fibers would be advantageous.

SUMMARY

The present disclosure is directed to systems and methods for measuring absorption coefficients of doped optical fibers.

In some examples, a system for measuring an absorption coefficient of a doped optical fiber may comprise: a laser source configured to transmit laser light at a selectable wavelength; a single-mode optical fiber comprising an end configured to splice to the doped optical fiber; two or more multimode fibers at a side of the doped optical fiber, spaced apart along the side of the doped optical fiber, configured to collect spontaneous emissions from the side of the doped optical fiber; and/or a photodiode or power meter connected to the two or more multimode fibers.

In some examples, the system may further comprise: an optical chopper between the laser source and the single-mode optical fiber; and/or a lock-in amplifier connected to the photodiode. The lock-in amplifier may be referenced to an operating frequency of the optical chopper.

In some examples, the lock-in amplifier may be referenced to the operating frequency of the optical chopper by connecting an output of the optical chopper to a reference frequency port of the lock-in amplifier.

In some examples, the system may further comprise: one or more polarizers between the laser source and the single-mode optical fiber.

In some examples, the system may further comprise: a beam splitter between the laser source and the single-mode optical fiber; and/or a power meter. The beam splitter may be configured to provide a portion of the laser light to the power meter.

In some examples, the system may further comprise: an optical element configured to couple the laser light into the single-mode optical fiber.

In some examples, the system may further comprise: a power meter configured to allow an operator to maximize power of the spontaneous emissions to the two or more multimode fibers.

In some examples, the photodiode may comprise two or more photodiodes, and/or each of the two or more photodiodes may be connected to a respective one of the two or more multimode fibers.

In some examples, the single-mode optical fiber may be a passive single-mode optical fiber.

In some examples, the doped optical fiber may comprise a single-mode fiber, a multi-mode fiber, a large-mode-area fiber, a photonic crystal fiber, or a double-clad rare-earth-doped optical fiber.

In some examples, the doped optical fiber may comprise a chalcogenide fiber, a silica fiber, or a ZBLAN ($ZrF_4$—$BaF_2$—$LaF_3$—$AlF_3$—NaF) fiber.

In some examples, the doped optical fiber may comprise a fused silica fiber, a fused quartz fiber, a natural quartz fiber, an aluminate glass fiber, an aluminophosphate glass fiber, an aluminosilicate glass fiber, a borate glass fiber, a borogermanate glass fiber, a borophosphate glass fiber, a borosilicate glass fiber, a chalcogenide glass fiber, a fluoride glass fiber, a fluorophosphate glass fiber, a germanate glass fiber, a germanosilicate glass fiber, a halide glass fiber, a phosphate glass fiber, a phosphosilicate glass fiber, a silicate glass fiber, or a tellurite glass fiber.

In some examples, a method for measuring an absorption coefficient of a doped optical fiber may comprise: collecting, from a side of the doped optical fiber, an emission spectrum using two or more multimode fibers; and/or calculating the absorption coefficient form using the emission spectrum and McCumber theory.

In some examples, the emission spectrum may comprise spontaneous emissions from the side of the doped optical fiber.

In some examples, the two or more multimode fibers may be at the side of the doped optical fiber, and/or the two or more multimode fibers may be spaced apart along the side of the doped optical fiber.

In some examples, a method for measuring an absorption coefficient of a doped optical fiber may comprise: providing laser light from a laser source at a selectable wavelength; coupling the laser light to an end of a single-mode optical fiber that is spliced to the doped optical fiber; collecting, from a side of the doped optical fiber, an emission spectrum using two or more multimode fibers; and/or providing the collected emission spectrum to a photodiode or power meter.

In some examples, the method may further comprise: calculating the absorption coefficient form using the emission spectrum and McCumber theory.

In some examples, the collecting, from the side of the doped optical fiber, of the emission spectrum using the two or more multimode fibers may comprise maximizing output power of the two or more multimode fibers by pumping the doped optical fiber at peak absorption wavelength.

In some examples, the method may further comprise: chopping the laser light using an optical chopper; and/or providing output of the photodiode to a lock-in amplifier. The lock-in amplifier may be referenced to an operating frequency of the optical chopper.

In some examples, the method may further comprise controlling power of the laser light using one or more polarizers. The controlling of the power of the laser light using the one or more polarizers may comprise controlling the power of the laser light using first and second polarizers in series by adjusting a polarizing angle of the first polarizer relative to a polarizing angle of the second polarizer.

DRAWINGS

The above and/or other aspects and advantages will become more apparent and more readily appreciated from the following detailed description of examples, taken in conjunction with the accompanying drawings, in which.

DETAILED DESCRIPTION

Figure 1:
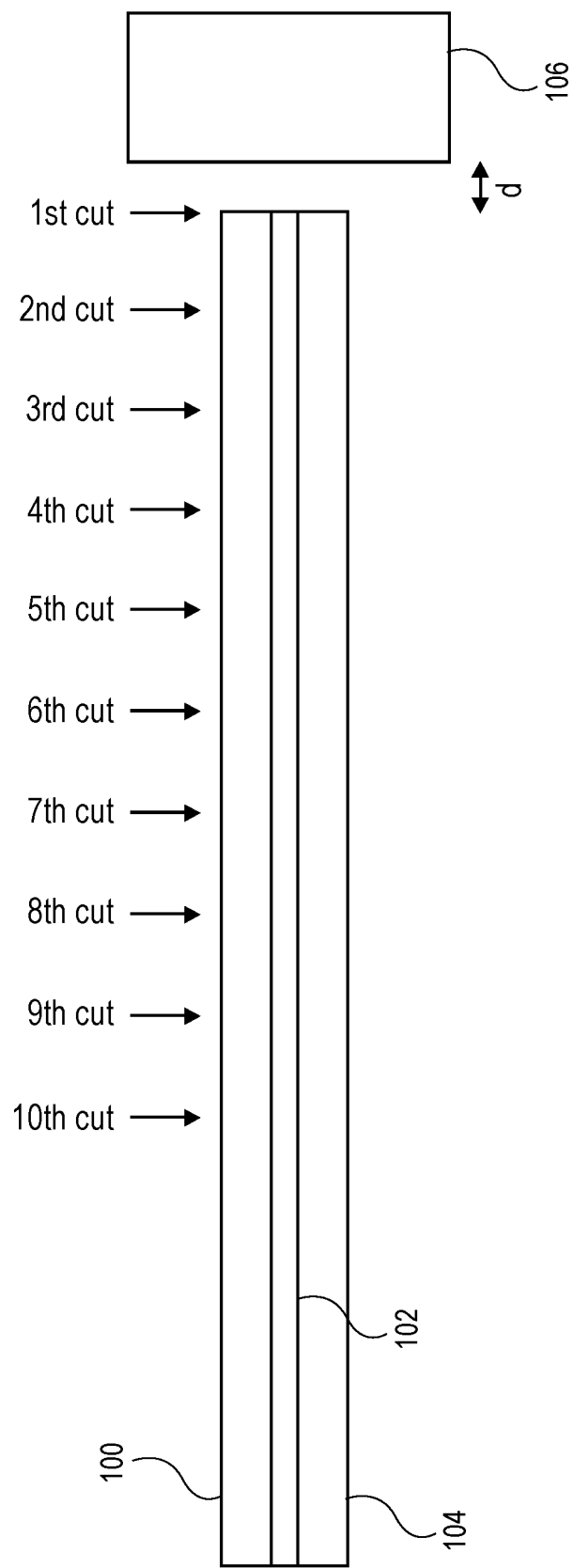
FIG. 1 depicts an example of a cutback method according to the conventional art.

Exemplary aspects will now be described more fully with reference to the accompanying drawings. Examples of the disclosure, however, may be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale. For example, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, or section could be termed a second element, component, region, layer, or section without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

The terminology used herein is for the purpose of describing particular examples only and is not intended to be limiting of examples. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which examples belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Implementations of the present disclosure address the need for non-destructive and accurate systems and methods for measuring absorption coefficients of doped optical fibers. The disclosed systems and methods are based on side-light analysis. The disclosed systems and methods can be incorporated into industrial fiber production and can be used for research, as well.

Advantages of the disclosed systems and methods for measuring absorption coefficients of doped optical fibers include, but are not limited to: the disclosed systems and methods do not destroy the doped optical fibers; the disclosed systems and methods do not require special equipment; the disclosed systems and methods allow measurement of absorption coefficients even when the doped optical fibers are inside of a laser cavity; the disclosed systems and methods are not influenced by the host material and structure; the disclosed systems and methods are not affected by the presence of cladding modes, which does not affect the amount of spontaneous emissions; the disclosed systems and methods do not require cladding modes to be reduced or eliminated by using index matching gels or other techniques; the disclosed systems and methods are not affected by the propagation of light through the cladding; the disclosed systems and methods do not require precise alignment of the multi-mode fibers; in the disclosed systems and methods, the distance between the multi-mode fibers can be selected with relative freedom; the disclosed systems and methods do not require efficient coupling of pump power to the doped core; and the disclosed systems and methods can be used with highly doped fibers.

Figure 2:
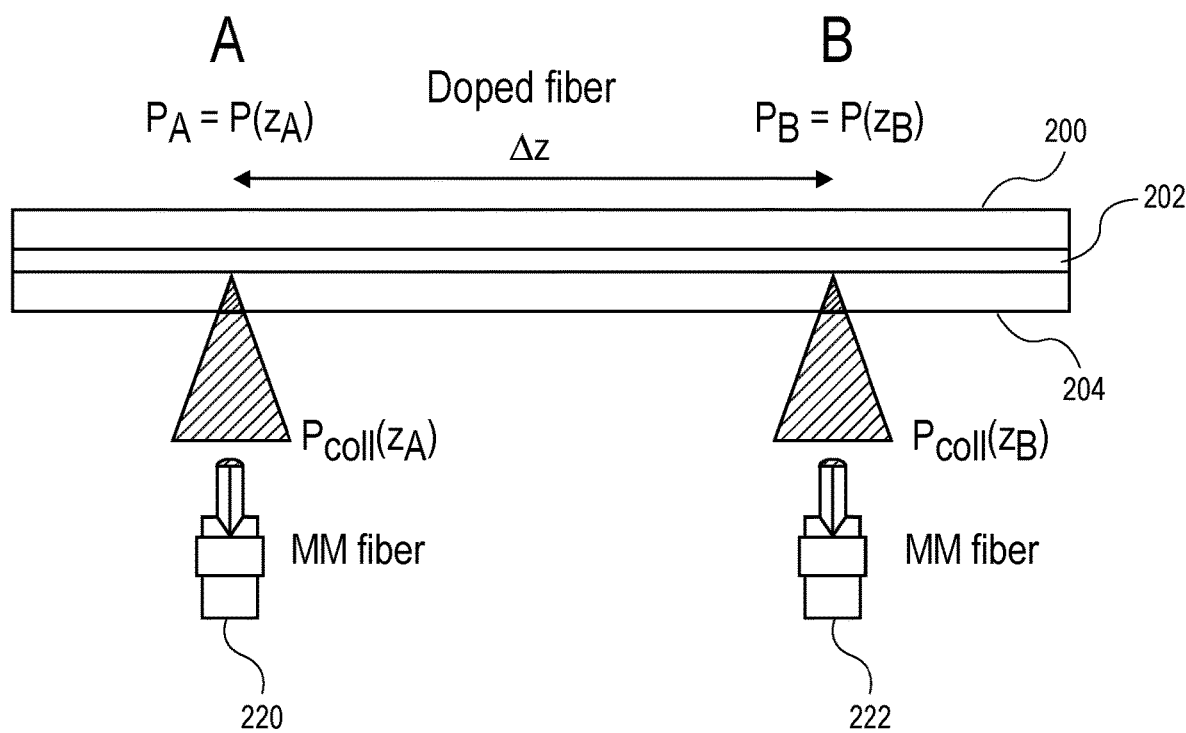
FIG. 2 depicts theory behind the systems and methods for measuring absorption coefficients of doped optical fibers.

FIG. 2 depicts theory behind the systems and methods for measuring absorption coefficients of doped optical fibers.

In FIG. 2, doped optical fiber 200 includes doped core 202 and cladding 204. In FIG. 2, pump light propagates through doped core 202 from left-to-right. The wavelength λ of the pump light is assumed to be in the proximity of the peak absorption wavelength for doped core 202, so that the resonant absorption coefficient $\alpha_r(\lambda)$ is much larger than the parasitic background absorption coefficient $\alpha_b$.

When a rare-earth doped optical fiber is pumped far below the saturation intensity, the spontaneous emission from the side of the fiber is directly proportional to pump power. Here, the pump intensity in doped core 202 is assumed to be far below the measured saturation intensity; therefore, the pump power propagating in doped core 202, $P_{core}(z)$, attenuates exponentially due to the absorption by the rare-earth dopant(s), according to Equation 1, with $P_0$ as the input pump power at z=0 (e.g., Beer-Lambert exponential decay form).

$$P_{core}(z) = P_0 \exp(-\alpha_r(\lambda)z) \tag{1}$$

First multi-mode fiber 220 (large diameter core, high numerical aperture) is configured to collect spontaneous emissions from the side of doped optical fiber 200 at point A, while second multi-mode fiber 222 (large diameter core, high numerical aperture) is configured to collect spontaneous emissions from the side of doped optical fiber 200 at point B.

Point A and point B are separated by a distance Δz. Point A, point B, and distance Δz remain unchanged throughout this discussion of theory.

The collection efficiencies of first multi-mode fiber 220 (point A) and second multi-mode fiber 222 (point B) may be slightly different due to unavoidable misalignments. Therefore, Equations 2a and 2b, where $P_{coll}(z_A)$ and $P_{coll}(z_B)$ are the collected powers at points A and B, are respectively:

$$P_{coll}(z_A) = \gamma_A P_{core}(z_A), \text{ and} \tag{2a}$$

$$P_{coll}(z_B) = \gamma_B P_{core}(z_B). \tag{2b}$$

$\gamma_A$ and $\gamma_B$ are coefficients that relate the propagating power in doped core 202 to the collected spontaneous emission power, which also incorporate the coupling efficiencies to first multi-mode fiber 220 at point A and to second multi-mode fiber 222 at point B.

Dividing Equation 2b by Equation 2a, and then taking the natural logarithm of both sides, yields Equations 3 and 4:

$$r(\lambda) = \ln(\gamma_B/\gamma_A) - \alpha_r(\lambda)\Delta z, \tag{3}$$

where $$r(\lambda) = \ln[P_{coll}(z_B)/P_{coll}(z_A)]. \tag{4}$$

In Equation 3, $\alpha_r(\lambda)$ follows a strict spectral function of the form:

$$\alpha_r(\lambda) \propto \lambda^5 S(\lambda) \exp(hc/\lambda k_B T), \tag{5}$$

where $S(\lambda)$ is the emission power spectral density measured by an optical spectrum analyzer, 'h' is the Planck constant, 'c' is the speed of light in a vacuum, λ is the wavelength of interest, $k_B$ is the Boltzmann constant, and 'T' is the effective temperature of the medium.

It is assumed that the ratio $\gamma_B/\gamma_A$ is wavelength-independent over the narrow range of wavelengths used during the associated measurements. Therefore, the left-hand side in Equation 3 ($r(\lambda)$) must also follow the spectral form in Equation 5 when the pump wavelength is varied.

Because the spectral shape of $\alpha_r(\lambda)$ is obtained from Equation 5, balancing the left-hand side and right-hand side of Equation 3 over the respective wavelengths yields the overall magnitude of $\alpha_r(\lambda)$. Therefore, $\alpha_r(\lambda)$ in Equation 3 is replaced with $\alpha_r^P \times \tilde{a}_r(\lambda)$, where $\tilde{a}_r(\lambda)$ is the absorption coefficient normalized to its peak value, $\alpha_r^P = \alpha_r(\lambda_{peak})$. Then both $\gamma_B/\gamma_A$ and $\alpha_r^P$ can be determined through a fitting procedure that involves measurements of $r(\lambda)$ and $\tilde{a}_r(\lambda)$ at multiple wavelengths near the peak absorption wavelength.

As the pump wavelength is varied, the input pump power changes slightly. However, as indicated by Equation 4, the disclosed systems and methods for measuring an absorption coefficient of a doped optical fiber rely on the ratio of the powers collected at point A and point B. For at least this reason, the disclosed systems and methods for measuring an absorption coefficient of a doped optical fiber are not affected by such variations in input pump power.

McCumber theory relates the absorption cross-section ($\sigma_{abs}(v)$) and the emission cross-section ($\sigma_{em}(v)$) of dopants in solid-state media, according to Equation 6:

$$\sigma_{abs}(v) = \sigma_{em}(v) \exp[(hv-\varepsilon)/k_B T], \tag{6}$$

where 'h' is the Planck constant, 'v' is the frequency of light, 'ε' is the so-called "zero-line" energy, $k_B$ is the Boltzmann constant, and 'T' is the effective temperature of the media.

Further derivation yields:

$$\alpha_r(\lambda) \approx \exp(-\varepsilon/k_B T)[(N_0/N_2)/8\pi hc^2 n^2]\lambda^5 S(\lambda) \exp(hc/\lambda k_B T), \tag{7}$$

where 'ε' is the so-called "zero-line" energy, $k_B$ is the Boltzmann constant, 'T' is the effective temperature of the media, $N_1$ is the population density of the lower manifold of the dopant ions, $N_2$ is the population density of the upper manifold of the dopant ions, $N_0 = N_1 + N_2$, 'h' is the Planck constant, 'c' is the speed of light in a vacuum, 'n' is the refractive index of the media, λ is the wavelength of interest, $S(\lambda)$ is the emission power spectral density measured by an optical spectrum analyzer, and where the wavelength-dependent part gives Equation 5.

The left-hand side of Equation 3 (see Equation 4) can be calculated using data collected by first multi-mode fiber 220 and second multi-mode fiber 222 at multiple wavelengths near the peak absorption wavelength. A portion of the right-hand side of Equation 3 can calculated using McCumber theory to extract the peak value of the resonant absorption coefficient $\alpha_r(\lambda)$, which is then normalized to a value of 1. Then the two unknowns, $\gamma_B/\gamma_A$ and $\alpha_r^P$, can be determined through a fitting procedure that involves measurements of $r(\lambda)$ and $\tilde{a}_r(\lambda)$ at the multiple wavelengths near the peak absorption wavelength.

In addition, when combined with the emission power spectral density $S(\lambda)$, which can be measured by an optical spectrum analyzer, the disclosed systems and methods for measuring an absorption coefficient of a doped optical fiber can be used to extract a full characterization of the resonant absorption coefficient $\alpha_r(\lambda)$ at all relevant wavelengths, not limited to the vicinity of the pump wavelength.

Figure 3:
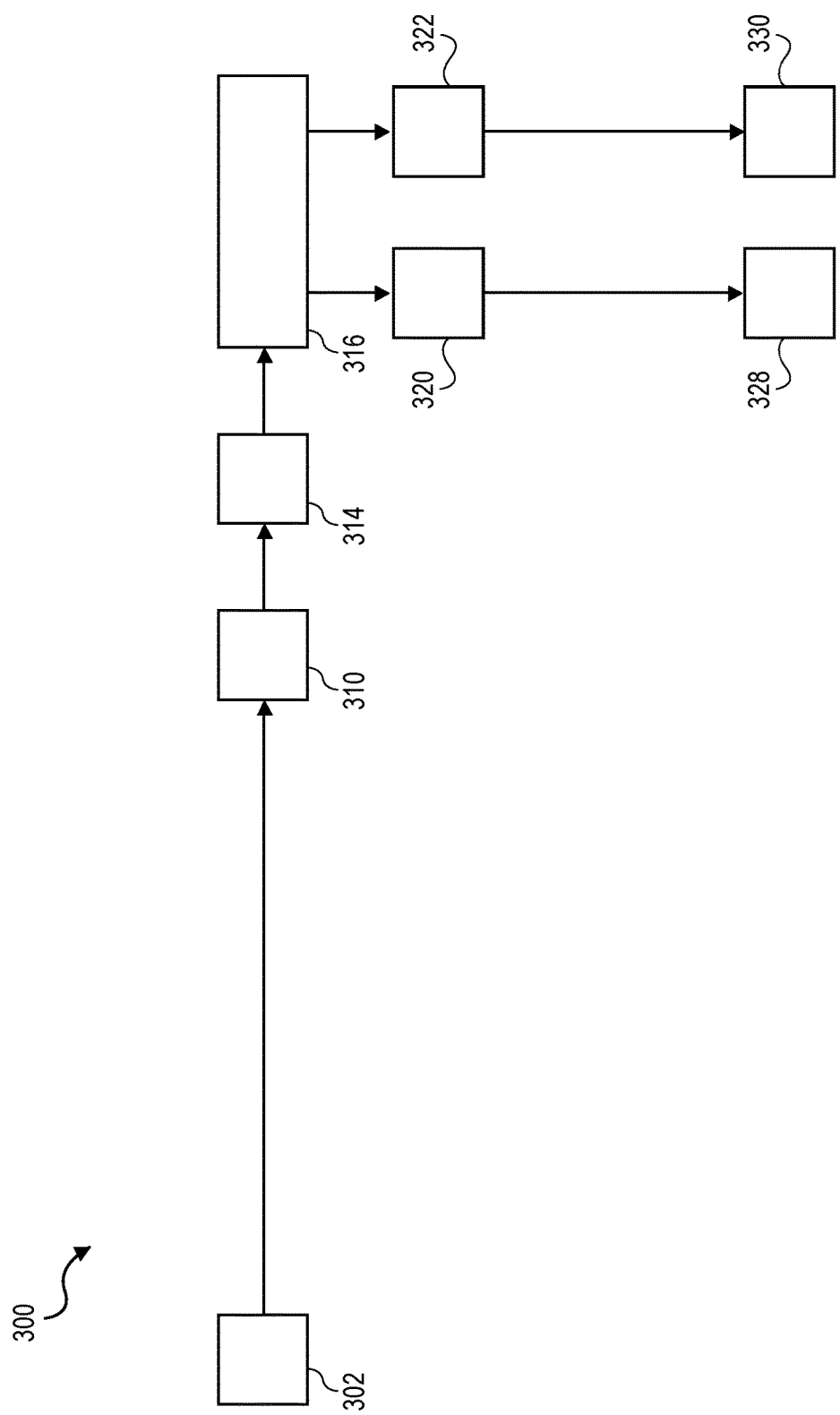
FIG. 3 depicts a system for measuring absorption coefficients of doped optical fibers, according to some example embodiments.

FIG. 3 depicts a system for measuring absorption coefficients of doped optical fibers, according to some example embodiments.

As shown in FIG. 3, for example, system 300 can comprise laser source 302, optical element 310, single-mode fiber 314, doped optical fiber 316, first multi-mode fiber 320, second multi-mode fiber 322, first photodiode 328, and/or second photodiode 330.

As shown in FIG. 3, laser light in system 300 generally is transmitted from left-to-right, from laser source 302, through optical element 310, through single-mode fiber 314, and through doped optical fiber 316.

Laser source 302 can be configured to transmit the laser light at a selectable wavelength. For purposes of measuring resonant absorption coefficients of doped optical fibers, laser source 302 can be configured to transmit laser light at a plurality of wavelengths, with associated measurements being made at each such wavelength. Laser source 302 can be, for example, a laser tunable to a selectable wavelength or two or more lasers that operate at different wavelengths. Laser source 302 can be, for example, a tunable continuous-wave ("CW") titanium-sapphire ("Ti:Sapphire") laser.

Optical element 310 can couple the laser light into single-mode fiber 314. Optical element 310 can be, for example, a 20X microscope objective.

Single-mode fiber 314 can be a passive single-mode optical fiber. Examples of single-mode fiber 314 include, but are not limited to, 980HP, 1060XP, SM980G80, or SM980-5.8-125, all from Thorlabs, Inc., of Newton, N.J.

Single-mode fiber 314 can be spliced to doped optical fiber 316 to deliver the pump power. The splice can be, for example, a fusion splice.

Doped optical fiber 316 can be, for example, a single-mode and single-clad optical fiber (e.g., SM-YSF-LO-HP, a ytterbium-doped, single-mode, single-clad optical fiber from Nufern, Inc.), which fluoresces due to excited $Yb^{3+}$ ions.

Doped optical fiber 316 can comprise a single-mode fiber, a multi-mode fiber, a large-mode-area fiber, a photonic crystal fiber, or a double-clad rare-earth-doped optical fiber.

Doped optical fiber 316 can comprise a chalcogenide fiber, a silica fiber, or a ZBLAN (ZrF4-BaF2-LaF3-AlF3-NaF) fiber.

Doped optical fiber 316 can comprise a fused silica fiber, a fused quartz fiber, a natural quartz fiber, an aluminate glass fiber, an aluminophosphate glass fiber, an aluminosilicate glass fiber, a borate glass fiber, a borogermanate glass fiber, a borophosphate glass fiber, a borosilicate glass fiber, a chalcogenide glass fiber, a fluoride glass fiber, a fluorophosphate glass fiber, a germanate glass fiber, a germanosilicate glass fiber, a halide glass fiber, a phosphate glass fiber, a phosphosilicate glass fiber, a silicate glass fiber, or a tellurite glass fiber.

First multi-mode fiber 320 can be configured to collect spontaneous emissions (e.g., an emissions spectrum) from the side of doped optical fiber 316. First multi-mode fiber 320 can be at a side of doped optical fiber 316, spaced apart from second multi-mode fiber 322 along the side of doped optical fiber 316 in order to improve accuracy. First multi-mode fiber 320 preferably has a large diameter core and a high numerical aperture to facilitate collecting the spontaneous emissions from doped optical fiber 316. Examples of first multi-mode fiber 320 include, but are not limited to, M42L01, M43L01, M69L01, M72L01, M74L01, M94L01, M123L01, M124L01, or M124L02, all from Thorlabs, Inc.

Second multi-mode fiber 322 can be configured to collect spontaneous emissions (e.g., an emissions spectrum) from the side of doped optical fiber 316. Second multi-mode fiber 322 can be at a side of doped optical fiber 316, spaced apart from first multi-mode fiber 320 along the side of doped optical fiber 316 in order to improve accuracy. Second multi-mode fiber 322 preferably has a large diameter core and a high numerical aperture to facilitate collecting the spontaneous emissions from doped optical fiber 316. Examples of second multi-mode fiber 322 include, but are not limited to, M42L01, M43L01, M69L01, M72L01, M74L01, M94L01, M123L01, M124L01, or M124L02, all from Thorlabs, Inc.

First photodiode 328 can be connected directly to first multi-mode fiber 320. First photodiode 328 can be, for example, an indium-gallium-arsenide ("InGaAs") biased detector (e.g., DET08CFC from Thorlabs, Inc.).

Second photodiode 330 can be connected directly to second multi-mode fiber 322. Second photodiode 330 can be, for example, an InGaAs biased detector (e.g., DET08CFC from Thorlabs, Inc.).

In some example embodiments, one or both of first photodiode 328 or second photodiode 330 can be replaced by a low-threshold photodiode or an avalanche photodiode.

For measuring the absorption coefficient of multi-mode fibers and double-clad rare-earth-doped optical fibers, due to their larger core size and stronger spontaneous emission signals, spontaneous emission power can be measured directly from doped optical fiber 316 using a power meter (e.g., S120C from Thorlabs, Inc.), not shown. Because the spontaneous emission power can be measured directly from doped optical fiber 316 using the power meter, first multi-mode fiber 320 and second multi-mode fiber 322 may not be required.

Figure 4:
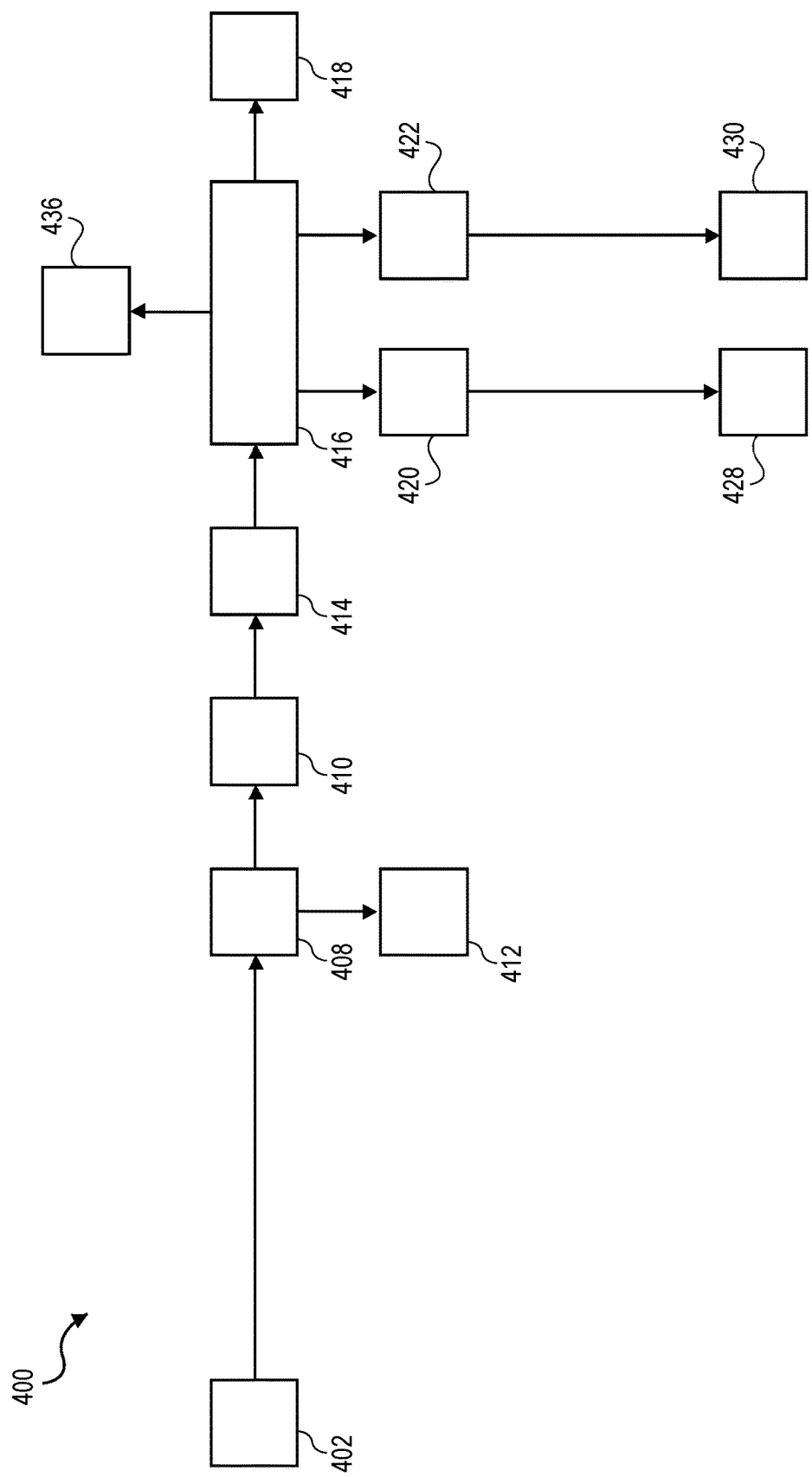
FIG. 4 depicts a system for measuring absorption coefficients of doped optical fibers, according to some example embodiments.

FIG. 4 depicts a system for measuring absorption coefficients of doped optical fibers, according to some example embodiments.

As shown in FIG. 4, for example, system 400 can comprise laser source 402, beam splitter 408, optical element 410, first power meter 412, single-mode fiber 414, doped optical fiber 416, second power meter 418, first multi-mode fiber 420, second multi-mode fiber 422, first photodiode 428, second photodiode 430, and/or optical spectrum analyzer 436.

As shown in FIG. 4, laser light in system 400 generally is transmitted from left-to-right, from laser source 402, through beam splitter 408, through optical element 410, through single-mode fiber 414, through doped optical fiber 416, and to second power meter 418.

Laser source 402 can be configured to transmit the laser light at a selectable wavelength. For purposes of measuring resonant absorption coefficients of doped optical fibers, laser source 402 can be configured to transmit laser light at a plurality of wavelengths, with associated measurements being made at each such wavelength. Laser source 402 can be, for example, a laser tunable to a selectable wavelength or two or more lasers that operate at different wavelengths. Laser source 402 can be, for example, a tunable CW Ti:Sapphire laser.

Beam splitter 408 can be between laser source 402 and single-mode fiber 414. Beam splitter 408 can split the laser light so that a first portion of the laser light goes to single-mode fiber 414 (e.g., via optical element 410), while a second portion of the laser light goes to first power meter 412. Preferably, the power of the first portion of the laser light is significantly larger than the power of the second portion of the laser light.

Optical element 410 can couple the laser light into single-mode fiber 414. Optical element 410 can be, for example, a 20X microscope objective.

First power meter 412 can measure the input power to single-mode fiber 414 in order to ensure that the pump intensity in the core of doped optical fiber 416 remains far below the saturation intensity of doped optical fiber 416.

First power meter 412 can be configured to allow an operator to maximize the power of the spontaneous emissions from doped optical fiber 416 to first multi-mode fiber 420 and/or second multi-mode fiber 422. The power of the spontaneous emissions from doped optical fiber 416 to first multi-mode fiber 420 and/or second multi-mode fiber 422 can be maximized, for example, by pumping doped optical fiber 416 at peak absorption wavelength.

Single-mode fiber 414 can be a passive single-mode optical fiber. Examples of single-mode fiber 414 include, but are not limited to, 980HP, 1060XP, SM980G80, or SM980-5.8-125, all from Thorlabs, Inc.

Single-mode fiber 414 can be spliced to doped optical fiber 416 to deliver the pump power. The splice can be, for example, a fusion splice.

Doped optical fiber 416 can be, for example, a single-mode and single-clad optical fiber (e.g., SM-YSF-LO-HP, a ytterbium-doped, single-mode, single-clad optical fiber from Nufern, Inc.), which fluoresces due to excited $Yb^{3+}$ ions.

Doped optical fiber 416 can comprise a single-mode fiber, a multi-mode fiber, a large-mode-area fiber, a photonic crystal fiber, or a double-clad rare-earth-doped optical fiber.

Doped optical fiber 416 can comprise a chalcogenide fiber, a silica fiber, or a ZBLAN ($ZrF4$-$BaF2$-$LaF3$-$AlF3$-$NaF$) fiber.

Doped optical fiber 416 can comprise a fused silica fiber, a fused quartz fiber, a natural quartz fiber, an aluminate glass fiber, an aluminophosphate glass fiber, an aluminosilicate glass fiber, a borate glass fiber, a borogermanate glass fiber, a borophosphate glass fiber, a borosilicate glass fiber, a chalcogenide glass fiber, a fluoride glass fiber, a fluorophosphate glass fiber, a germanate glass fiber, a germanosilicate glass fiber, a halide glass fiber, a phosphate glass fiber, a phosphosilicate glass fiber, a silicate glass fiber, or a tellurite glass fiber.

Second power meter 418 can measure the output power of doped optical fiber 416 as a second check in order to ensure that the pump intensity in the core of doped optical fiber 416 remains far below the saturation intensity of doped optical fiber 416.

First multi-mode fiber 420 can be configured to collect spontaneous emissions (e.g., an emissions spectrum) from the side of doped optical fiber 416. First multi-mode fiber 420 can be at a side of doped optical fiber 416, spaced apart from second multi-mode fiber 422 along the side of doped optical fiber 416 in order to improve accuracy. First multi-mode fiber 420 preferably has a large diameter core and a high numerical aperture to facilitate collecting the spontaneous emissions from doped optical fiber 416. Examples of first multi-mode fiber 420 include, but are not limited to, M42L01, M43L01, M69L01, M72L01, M74L01, M94L01, M123L01, M124L01, or M124L02, all from Thorlabs, Inc.

Second multi-mode fiber 422 can be configured to collect spontaneous emissions (e.g., an emissions spectrum) from the side of doped optical fiber 416. Second multi-mode fiber 422 can be at a side of doped optical fiber 416, spaced apart from first multi-mode fiber 420 along the side of doped optical fiber 416 in order to improve accuracy. Second multi-mode fiber 422 preferably has a large diameter core and a high numerical aperture to facilitate collecting the spontaneous emissions from doped optical fiber 416. Examples of second multi-mode fiber 422 include, but are not limited to, M42L01, M43L01, M69L01, M72L01, M74L01, M94L01, M123L01, M124L01, or M124L02, all from Thorlabs, Inc.

First photodiode 428 can be connected directly to first multi-mode fiber 420. First photodiode 428 can be, for example, an indium-gallium-arsenide ("InGaAs") biased detector (e.g., DET08CFC from Thorlabs, Inc).

Second photodiode 430 can be connected directly to second multi-mode fiber 422. Second photodiode 430 can be, for example, an InGaAs biased detector (e.g., DET08CFC from Thorlabs, Inc.).

In some example embodiments, one or both of first photodiode 428 or second photodiode 430 can be replaced by a low-threshold photodiode or an avalanche photodiode.

Optical spectrum analyzer 436 can measure the emission spectrum (e.g., emission power spectral density $S(\lambda)$) directly from doped optical fiber 416.

For measuring the absorption coefficient of multi-mode fibers and double-clad rare-earth-doped optical fibers, due to their larger core size and stronger spontaneous emission signals, spontaneous emission power can be measured directly from doped optical fiber 416 using a third power meter (e.g., S120C from Thorlabs, Inc.), not shown. Because the spontaneous emission power can be measured directly from doped optical fiber 416 using the third power meter, first multi-mode fiber 420 and second multi-mode fiber 422 may not be required.

For measuring the absorption coefficient of multi-mode fibers, the emission spectrums could be measured at Point A and Point B using optical spectrum analyzer 436. Because the emission spectrum can be measured directly from doped optical fiber 416 using optical spectrum analyzer 436, first multi-mode fiber 420, second multi-mode fiber 422, first photodiode 428, and second photodiode 430 may not be required.

Using this approach for measuring the absorption coefficient of a multi-mode fiber, the peak of the pump power scattering should be removed from the emission spectrum. Then the integral under the emission spectrum should be proportional to the emission power, and the emission power should be proportional to the pump power that is propagating in the core of the multi-mode fiber.

Figure 5:
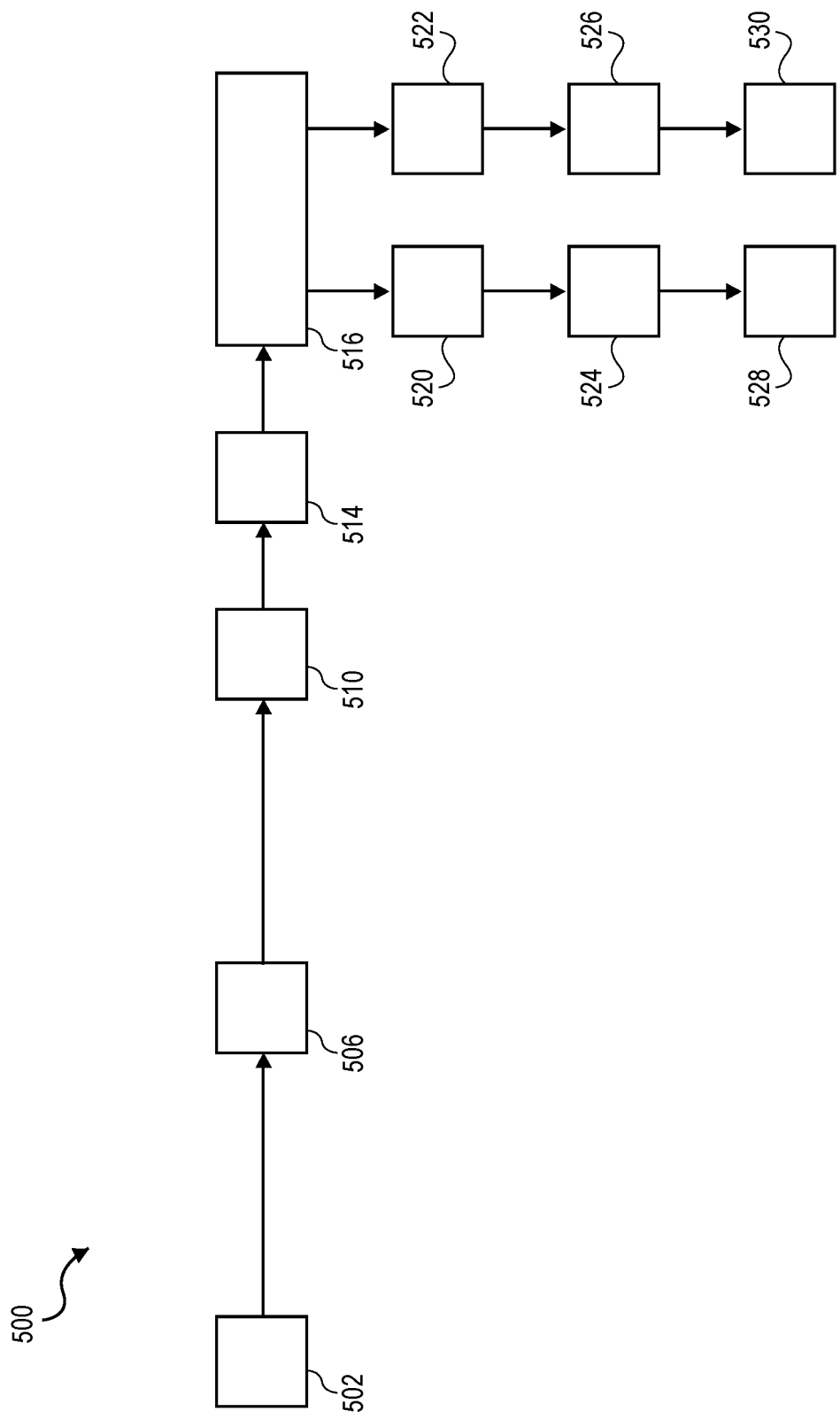
FIG. 5 depicts a system for measuring absorption coefficients of doped optical fibers, according to some example embodiments.

FIG. 5 depicts a system for measuring absorption coefficients of doped optical fibers, according to some example embodiments.

As shown in FIG. 5, for example, system 500 can comprise laser source 502, one or more polarizers 506, optical element 510, single-mode fiber 514, doped optical fiber 516, first multi-mode fiber 520, second multi-mode fiber 522, first long-pass filter 524, second long-pass filter 526, first photodiode 528, and/or second photodiode 530.

As shown in FIG. 5, laser light in system 500 generally is transmitted from left-to-right, from laser source 502, through one or more polarizers 506, through optical element 510, through single-mode fiber 514, and through doped optical fiber 516.

Laser source 502 can be configured to transmit the laser light at a selectable wavelength. For purposes of measuring resonant absorption coefficients of doped optical fibers, laser source 502 can be configured to transmit laser light at a plurality of wavelengths, with associated measurements being made at each such wavelength. Laser source 502 can be, for example, a laser tunable to a selectable wavelength or two more lasers that operate at different wavelengths. Laser source 502 can be, for example, a tunable CW Ti:Sapphire laser.

One or more polarizers 506 can be between laser source 502 and single-mode fiber 514. One or more polarizers 506 can control the power of the laser light in order to keep the pump intensity in the core of doped optical fiber 516 far below the saturation intensity of doped optical fiber 516. One or more polarizers 506 can comprise, for example, one or more linear polarizers (e.g., two linear polarizers in series). As known to a PHOSITA, a single linear polarizer 506 can reduce the intensity of laser light by 50%, and two linear polarizers in series can reduce the intensity of laser light by 50% 100% (e.g., the power of the laser light can be controlled using first and second polarizers in series by adjusting a polarizing angle of the first polarizer relative to a polarizing angle of the second polarizer).

Optical element 510 can couple the laser light into single-mode fiber 514. Optical element 510 can be, for example, a 20X microscope objective.

Single-mode fiber 514 can be a passive single-mode optical fiber. Examples of single-mode fiber 514 include, but are not limited to, 980HP, 1060XP, SM980G80, or SM980-5.8-125, all from Thorlabs, Inc.

Single-mode fiber 514 can be spliced to doped optical fiber 516 to deliver the pump power. The splice can be, for example, a fusion splice.

Doped optical fiber 516 can be, for example, a single-mode and single-clad optical fiber (e.g., SM-YSF-LO-HP, a ytterbium-doped, single-mode, single-clad optical fiber from Nufern, Inc.), which fluoresces due to excited $Yb^{3+}$ ions.

Doped optical fiber 516 can comprise a single-mode fiber, a multi-mode fiber, a large-mode-area fiber, a photonic crystal fiber, or a double-clad rare-earth-doped optical fiber.

Doped optical fiber 516 can comprise a chalcogenide fiber, a silica fiber, or a ZBLAN (ZrF4-BaF2-LaF3-AlF3-NaF) fiber.

Doped optical fiber 516 can comprise a fused silica fiber, a fused quartz fiber, a natural quartz fiber, an aluminate glass fiber, an aluminophosphate glass fiber, an aluminosilicate glass fiber, a borate glass fiber, a borogermanate glass fiber, a borophosphate glass fiber, a borosilicate glass fiber, a chalcogenide glass fiber, a fluoride glass fiber, a fluorophosphate glass fiber, a germanate glass fiber, a germanosilicate glass fiber, a halide glass fiber, a phosphate glass fiber, a phosphosilicate glass fiber, a silicate glass fiber, or a tellurite glass fiber.

First multi-mode fiber 520 can be configured to collect spontaneous emissions (e.g., an emissions spectrum) from the side of doped optical fiber 516. First multi-mode fiber 520 can be at a side of doped optical fiber 516, spaced apart from second multi-mode fiber 522 along the side of doped optical fiber 516 in order to improve accuracy. First multi-mode fiber 520 preferably has a large diameter core and a high numerical aperture to facilitate collecting the spontaneous emissions from doped optical fiber 516. Examples of first multi-mode fiber 520 include, but are not limited to, M42L01, M43L01, M69L01, M72L01, M74L01, M94L01, M123L01, M124L01, or M124L02, all from Thorlabs, Inc.

Second multi-mode fiber 522 can be configured to collect spontaneous emissions (e.g., an emissions spectrum) from the side of doped optical fiber 516. Second multi-mode fiber 522 can be at a side of doped optical fiber 516, spaced apart from first multi-mode fiber 520 along the side of doped optical fiber 516 in order to improve accuracy. Second multi-mode fiber 522 preferably has a large diameter core and a high numerical aperture to facilitate collecting the spontaneous emissions from doped optical fiber 516. Examples of second multi-mode fiber 522 include, but are not limited to, M42L01, M43L01, M69L01, M72L01, M74L01, M94L01, M123L01, M124L01, or M124L02, all from Thorlabs, Inc.

First long-pass filter 524, between first multi-mode fiber 520 and first photodiode 528, can ensure that scattered pump light (e.g., at wavelengths less than 1 m; selection of a specific filter can depend on dopant material(s) and/or pump wavelength) from doped optical fiber 516 does not contaminate the fluorescence signal to first photodiode 528. For example, first long-pass filter 524 can pass wavelengths greater than or equal to 1 μm.

Second long-pass filter 526, between second multi-mode fiber 522 and second photodiode 530, can ensure that scattered pump light (e.g., at wavelengths less than 1 m; selection of a specific filter can depend on dopant material(s) and/or pump wavelength) from doped optical fiber 516 does not contaminate the fluorescence signal to second photodiode 530. For example, second long-pass filter 526 can pass wavelengths greater than or equal to 1 μm.

First photodiode 528 can be connected directly to first multi-mode fiber 520, or can be connected to first multi-mode fiber 520 via first long-pass filter 524. First photodiode 528 can be, for example, an indium-gallium-arsenide ("InGaAs") biased detector (e.g., DET08CFC from Thorlabs, Inc.).

Second photodiode 530 can be connected directly to second multi-mode fiber 522, or can be connected to second multi-mode fiber 522 via second long-pass filter 526. Second photodiode 530 can be, for example, an InGaAs biased detector (e.g., DET08CFC from Thorlabs, Inc.).

In some example embodiments, one or both of first photodiode 528 or second photodiode 530 can be replaced by a low-threshold photodiode or an avalanche photodiode.

For measuring the absorption coefficient of multi-mode fibers and double-clad rare-earth-doped optical fibers, due to their larger core size and stronger spontaneous emission signals, spontaneous emission power can be measured directly from doped optical fiber 516 using a power meter (e.g., S120C from Thorlabs, Inc.), not shown. Because the spontaneous emission power can be measured directly from doped optical fiber 516 using the power meter, first multi-mode fiber 520, second multi-mode fiber 522, first long-pass filter 524, second long-pass filter 526, first photodiode 528, and second photodiode 530 may not be required.

Figure 6:
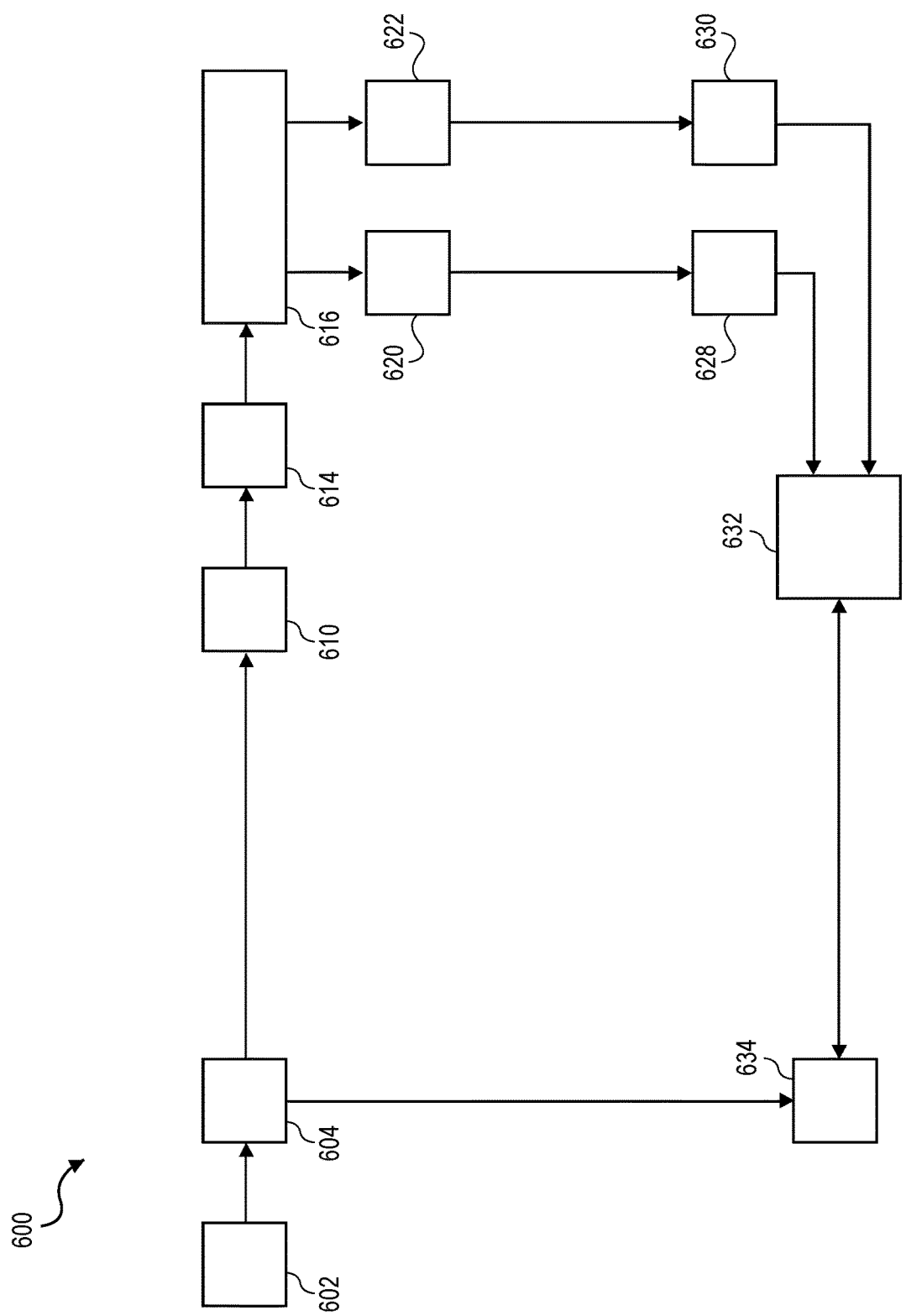
FIG. 6 depicts a system for measuring absorption coefficients of doped optical fibers, according to some example embodiments.

FIG. 6 depicts a system for measuring absorption coefficients of doped optical fibers, according to some example embodiments.

As shown in FIG. 6, for example, system 600 can comprise laser source 602, optical chopper 604, optical element 610, single-mode fiber 614, doped optical fiber 616, first multi-mode fiber 620, second multi-mode fiber 622, first photodiode 628, second photodiode 630, lock-in amplifier 632, oscilloscope 634, and/or optical spectrum analyzer 636.

As shown in FIG. 6, laser light in system 600 generally is transmitted from left-to-right, from laser source 602, through optical chopper 604, through optical element 610, through single-mode fiber 614, and through doped optical fiber 616.

Laser source 602 can be configured to transmit the laser light at a selectable wavelength. For purposes of measuring resonant absorption coefficients of doped optical fibers, laser source 602 can be configured to transmit laser light at a plurality of wavelengths, with associated measurements being made at each such wavelength. Laser source 602 can be, for example, a laser tunable to a selectable wavelength or two or more lasers that operate at different wavelengths. Laser source 602 can be, for example, a tunable CW Ti:Sapphire laser.

Optical chopper 604 can be between laser source 602 and single-mode fiber 614. Optical chopper 604 can modulate the laser light (e.g., by chopping the laser light) in order to facilitate the use of lock-in amplifier 632 to amplify the side-light signal. For example, optical chopper 604 can modulate the laser light at a frequency of 1 kilohertz ("kHz").

Optical element 610 can couple the laser light into single-mode fiber 614. Optical element 610 can be, for example, a 20X microscope objective.

Single-mode fiber 614 can be a passive single-mode optical fiber. Examples of single-mode fiber 614 include, but are not limited to, 980HP, 1060XP, SM980G80, or SM980-5.8-125, all from Thorlabs, Inc.

Single-mode fiber 614 can be spliced to doped optical fiber 616 to deliver the pump power. The splice can be, for example, a fusion splice.

Doped optical fiber 616 can be, for example, a single-mode and single-clad optical fiber (e.g., SM-YSF-LO-HP, a ytterbium-doped, single-mode, single-clad optical fiber from Nufern, Inc.), which fluoresces due to excited $Yb^{3+}$ ions.

Doped optical fiber 616 can comprise a single-mode fiber, a multi-mode fiber, a large-mode-area fiber, a photonic crystal fiber, or a double-clad rare-earth-doped optical fiber.

Doped optical fiber 616 can comprise a chalcogenide fiber, a silica fiber, or a ZBLAN (ZrF4-BaF2-LaF3-AlF3-NaF) fiber.

Doped optical fiber 616 can comprise a fused silica fiber, a fused quartz fiber, a natural quartz fiber, an aluminate glass fiber, an aluminophosphate glass fiber, an aluminosilicate glass fiber, a borate glass fiber, a borogermanate glass fiber, a borophosphate glass fiber, a borosilicate glass fiber, a chalcogenide glass fiber, a fluoride glass fiber, a fluorophosphate glass fiber, a germanate glass fiber, a germanosilicate glass fiber, a halide glass fiber, a phosphate glass fiber, a phosphosilicate glass fiber, a silicate glass fiber, or a tellurite glass fiber.

First multi-mode fiber 620 can be configured to collect spontaneous emissions (e.g., an emissions spectrum) from the side of doped optical fiber 616. First multi-mode fiber 620 can be at a side of doped optical fiber 616, spaced apart from second multi-mode fiber 622 along the side of doped optical fiber 616 in order to improve accuracy. First multi-mode fiber 620 preferably has a large diameter core and a high numerical aperture to facilitate collecting the spontaneous emissions from doped optical fiber 616. Examples of first multi-mode fiber 620 include, but are not limited to, M42L01, M43L01, M69L01, M72L01, M74L01, M94L01, M123L01, M124L01, or M124L02, all from Thorlabs, Inc.

Second multi-mode fiber 622 can be configured to collect spontaneous emissions (e.g., an emissions spectrum) from the side of doped optical fiber 616. Second multi-mode fiber 622 can be at a side of doped optical fiber 616, spaced apart from first multi-mode fiber 620 along the side of doped optical fiber 616 in order to improve accuracy. Second multi-mode fiber 622 preferably has a large diameter core and a high numerical aperture to facilitate collecting the spontaneous emissions from doped optical fiber 616. Examples of second multi-mode fiber 622 include, but are not limited to, M42L01, M43L01, M69L01, M72L01, M74L01, M94L01, M123L01, M124L01, or M124L02, all from Thorlabs, Inc.

First photodiode 628 can be connected directly to first multi-mode fiber 620. First photodiode 628 can be, for example, an indium-gallium-arsenide ("InGaAs") biased detector (e.g., DET08CFC from Thorlabs, Inc.).

Second photodiode 630 can be connected directly to second multi-mode fiber 622. Second photodiode 630 can be, for example, an InGaAs biased detector (e.g., DET08CFC from Thorlabs, Inc.).

First photodiode 628 and/or second photodiode 630 also can be connected to lock-in amplifier 632. Lock-in amplifier 632 can extract a weak spontaneous emission signal from a noisy background.

In some example embodiments, one or both of first photodiode 628 or second photodiode 630 can be replaced by a low-threshold photodiode or an avalanche photodiode, which would not require lock-in amplifier 632.

Lock-in amplifier 632 can be referenced to an operating frequency of optical chopper 604. For example, lock-in amplifier 632 can be referenced to the operating frequency of optical chopper 604 by connecting an output of optical chopper 604 to a reference frequency port of lock-in amplifier 632. This may be preferred, for example, in the case of single-mode optical fibers due to low side-light signal. As discussed above, optical chopper 604 can modulate the laser light at a frequency, for example, of 1 kHz.

Oscilloscope 634 can provide a visual display of the extracted spontaneous emission signal.

For measuring the absorption coefficient of multi-mode fibers and double-clad rare-earth-doped optical fibers, due to their larger core size and stronger spontaneous emission signals, lock-in amplifier 632 (and, thus, optical chopper 604) may not be required. Instead, spontaneous emission power can be measured directly from doped optical fiber 616 using a power meter (e.g., S120C from Thorlabs, Inc.), not shown. Because the spontaneous emission power can be measured directly from doped optical fiber 616 using the power meter, first multi-mode fiber 620, second multi-mode fiber 622, first photodiode 628, and/or second photodiode 630 may not be required.

Figure 7:
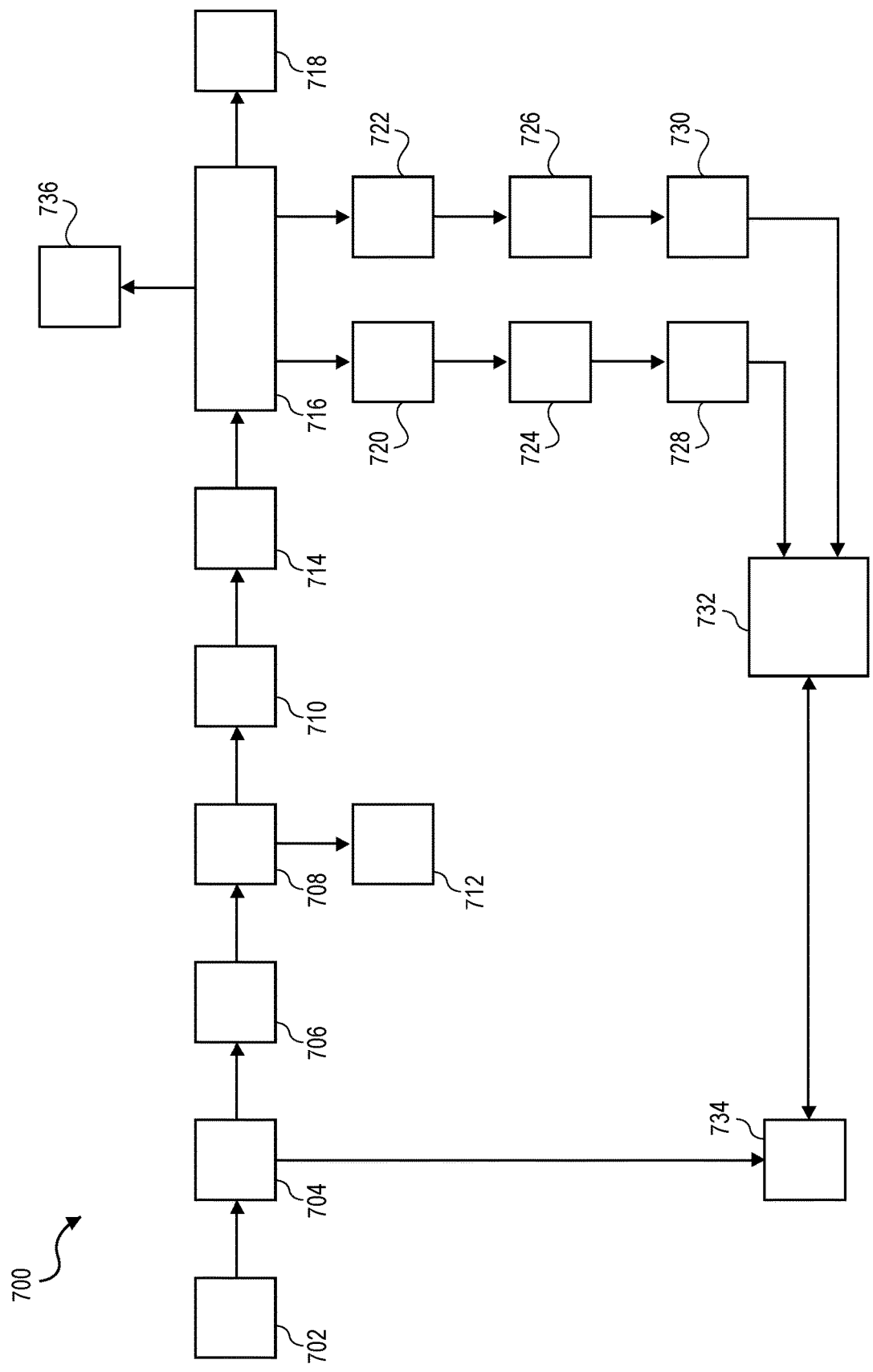
FIG. 7 depicts a system for measuring absorption coefficients of doped optical fibers, according to some example embodiments.

FIG. 7 depicts a system for measuring absorption coefficients of doped optical fibers, according to some example embodiments.

As shown in FIG. 7, for example, system 700 can comprise laser source 702, optical chopper 704, one or more polarizers 706, beam splitter 708, optical element 710, first power meter 712, single-mode fiber 714, doped optical fiber 716, second power meter 718, first multi-mode fiber 720, second multi-mode fiber 722, first long-pass filter 724, second long-pass filter 726, first photodiode 728, second photodiode 730, lock-in amplifier 732, oscilloscope 734, and/or optical spectrum analyzer 736.

As shown in FIG. 7, laser light in system 700 generally is transmitted from left-to-right, from laser source 702, through optical chopper 704, through one or more polarizers 706, through beam splitter 708, through optical element 710, through single-mode fiber 714, through doped optical fiber 716, and to second power meter 718.

Laser source 702 can be configured to transmit the laser light at a selectable wavelength. For purposes of measuring resonant absorption coefficients of doped optical fibers, laser source 702 can be configured to transmit laser light at a plurality of wavelengths, with associated measurements being made at each such wavelength. Laser source 702 can be, for example, a laser tunable to a selectable wavelength or two or more lasers that operate at different wavelengths. Laser source 702 can be, for example, a tunable CW Ti:Sapphire laser.

Optical chopper 704 can be between laser source 702 and single-mode fiber 714. Optical chopper 704 can modulate the laser light (e.g., by chopping the laser light) in order to facilitate the use of lock-in amplifier 732 to amplify the side-light signal. For example, optical chopper 704 can modulate the laser light at a frequency of 1 kilohertz ("kHz").

One or more polarizers 706 can be between laser source 702 and single-mode fiber 714. One or more polarizers 706 can control the power of the laser light in order to keep the pump intensity in the core of doped optical fiber 716 far below the saturation intensity of doped optical fiber 716. One or more polarizers 706 can comprise, for example, one or more linear polarizers (e.g., two linear polarizers in series). As known to a PHOSITA, a single linear polarizer 706 can reduce the intensity of laser light by 50%, and two linear polarizers in series can reduce the intensity of laser light by 50%-100% (e.g., the power of the laser light can be controlled using first and second polarizers in series by adjusting a polarizing angle of the first polarizer relative to a polarizing angle of the second polarizer).

Beam splitter 708 can be between laser source 702 and single-mode fiber 714. Beam splitter 708 can split the laser light so that a first portion of the laser light goes to single-mode fiber 714 (e.g., via optical element 710), while a second portion of the laser light goes to first power meter 712. Preferably, the power of the first portion of the laser light is significantly larger than the power of the second portion of the laser light.

Optical element 710 can couple the laser light into single-mode fiber 714. Optical element 710 can be, for example, a 20X microscope objective.

First power meter 712 can measure the input power to single-mode fiber 714 in order to ensure that the pump intensity in the core of doped optical fiber 716 remains far below the saturation intensity of doped optical fiber 716.

First power meter 712 can be configured to allow an operator to maximize the power of the spontaneous emissions from doped optical fiber 716 to first multi-mode fiber 720 and/or second multi-mode fiber 722. The power of the spontaneous emissions from doped optical fiber 716 to first multi-mode fiber 720 and/or second multi-mode fiber 722 can be maximized, for example, by pumping doped optical fiber 716 at peak absorption wavelength.

Single-mode fiber 714 can be a passive single-mode optical fiber. Examples of single-mode fiber 714 include, but are not limited to, 980HP, 1060XP, SM980G80, or SM980-5.8-125, all from Thorlabs, Inc.

Single-mode fiber 714 can be spliced to doped optical fiber 716 to deliver the pump power. The splice can be, for example, a fusion splice.

Doped optical fiber 716 can be, for example, a single-mode and single-clad optical fiber (e.g., SM-YSF-LO-HP, a ytterbium-doped, single-mode, single-clad optical fiber from Nufern, Inc.), which fluoresces due to excited $Yb^{3+}$ ions.

Doped optical fiber 716 can comprise a single-mode fiber, a multi-mode fiber, a large-mode-area fiber, a photonic crystal fiber, or a double-clad rare-earth-doped optical fiber.

Doped optical fiber 716 can comprise a chalcogenide fiber, a silica fiber, or a ZBLAN ($ZrF_4$—$BaF_2$—$LaF_3$—$AlF_3$—NaF) fiber.

Doped optical fiber 716 can comprise a fused silica fiber, a fused quartz fiber, a natural quartz fiber, an aluminate glass fiber, an aluminophosphate glass fiber, an aluminosilicate glass fiber, a borate glass fiber, a borogermanate glass fiber, a borophosphate glass fiber, a borosilicate glass fiber, a chalcogenide glass fiber, a fluoride glass fiber, a fluorophosphate glass fiber, a germanate glass fiber, a germanosilicate glass fiber, a halide glass fiber, a phosphate glass fiber, a phosphosilicate glass fiber, a silicate glass fiber, or a tellurite glass fiber.

Second power meter 718 can measure the output power of doped optical fiber 716 as a second check in order to ensure that the pump intensity in the core of doped optical fiber 716 remains far below the saturation intensity of doped optical fiber 716.

First multi-mode fiber 720 can be configured to collect spontaneous emissions (e.g., an emissions spectrum) from the side of doped optical fiber 716. First multi-mode fiber 720 can be at a side of doped optical fiber 716, spaced apart from second multi-mode fiber 722 along the side of doped optical fiber 716 in order to improve accuracy. First multi-mode fiber 720 preferably has a large diameter core and a high numerical aperture to facilitate collecting the spontaneous emissions from doped optical fiber 716. Examples of first multi-mode fiber 720 include, but are not limited to, M42L01, M43L01, M69L01, M72L01, M74L01, M94L01, M123L01, M124L01, or M124L02, all from Thorlabs, Inc.

Second multi-mode fiber 722 can be configured to collect spontaneous emissions (e.g., an emissions spectrum) from the side of doped optical fiber 716. Second multi-mode fiber 722 can be at a side of doped optical fiber 716, spaced apart from first multi-mode fiber 720 along the side of doped optical fiber 716 in order to improve accuracy. Second multi-mode fiber 722 preferably has a large diameter core and a high numerical aperture to facilitate collecting the spontaneous emissions from doped optical fiber 716. Examples of second multi-mode fiber 722 include, but are not limited to, M42L01, M43L01, M69L01, M72L01, M74L01, M94L01, M123L01, M124L01, or M124L02, all from Thorlabs, Inc.

First long-pass filter 724, between first multi-mode fiber 720 and first photodiode 728, can ensure that scattered pump light (e.g., at wavelengths less than 1 m; selection of a specific filter can depend on dopant material(s) and/or pump wavelength) from doped optical fiber 716 does not contaminate the fluorescence signal to first photodiode 728. For example, first long-pass filter 724 can pass wavelengths greater than or equal to 1 μm.

Second long-pass filter 726, between second multi-mode fiber 722 and second photodiode 730, can ensure that scattered pump light (e.g., at wavelengths less than 1 m; selection of a specific filter can depend on dopant material(s) and/or pump wavelength) from doped optical fiber 716 does not contaminate the fluorescence signal to second photodiode 730. For example, second long-pass filter 726 can pass wavelengths greater than or equal to 1 μm.

First photodiode 728 can be connected directly to first multi-mode fiber 720, or can be connected to first multi-mode fiber 720 via first long-pass filter 724. First photodiode 728 can be, for example, an indium-gallium-arsenide ("InGaAs") biased detector (e.g., DET08CFC from Thorlabs, Inc.).

Second photodiode 730 can be connected directly to second multi-mode fiber 722, or can be connected to second multi-mode fiber 722 via second long-pass filter 726. Second photodiode 730 can be, for example, an InGaAs biased detector (e.g., DET08CFC from Thorlabs, Inc.).

First photodiode 728 and/or second photodiode 730 also can be connected to lock-in amplifier 732. Lock-in amplifier 732 can extract a weak spontaneous emission signal from a noisy background.

In some example embodiments, one or both of first photodiode 728 or second photodiode 730 can be replaced by a low-threshold photodiode or an avalanche photodiode, which would not require lock-in amplifier 732.

Lock-in amplifier 732 can be referenced to an operating frequency of optical chopper 704. For example, lock-in amplifier 732 can be referenced to the operating frequency of optical chopper 704 by connecting an output of optical chopper 704 to a reference frequency port of lock-in amplifier 732. This may be preferred, for example, in the case of single-mode optical fibers due to low side-light signal. As discussed above, optical chopper 704 can modulate the laser light at a frequency, for example, of 1 kHz.

Oscilloscope 734 can provide a visual display of the extracted spontaneous emission signal.

Optical spectrum analyzer 736 can measure the emission spectrum (e.g., emission power spectral density $S(\lambda)$) directly from doped optical fiber 716.

For measuring the absorption coefficient of multi-mode fibers and double-clad rare-earth-doped optical fibers, due to their larger core size and stronger spontaneous emission signals, lock-in amplifier 732 (and, thus, optical chopper 704) may not be required. Instead, spontaneous emission power can be measured directly from doped optical fiber 716 using a third power meter (e.g., S120C from Thorlabs, Inc.), not shown. Because the spontaneous emission power can be measured directly from doped optical fiber 716 using the third power meter, first multi-mode fiber 720, second multi-mode fiber 722, first long-pass filter 724, and second long-pass filter 726 may not be required.

For measuring the absorption coefficient of multi-mode fibers, the emission spectrums could be measured at Point A and Point B using optical spectrum analyzer 736. Because the emission spectrum can be measured directly from doped optical fiber 716 using optical spectrum analyzer 736, optical chopper 704, first multi-mode fiber 720, second multi-mode fiber 722, first long-pass filter 724, second long-pass filter 726, first photodiode 728, second photodiode 730, and lock-in amplifier 732 may not be required.

Using this approach for measuring the absorption coefficient of a multi-mode fiber, the peak of the pump power scattering should be removed from the emission spectrum. Then the integral under the emission spectrum should be proportional to the emission power, and the emission power should be proportional to the pump power that is propagating in the core of the multi-mode fiber.

As discussed above, the left-hand side of Equation 3 (see Equation 4) can be calculated using data collected by first multi-mode fiber 220 and second multi-mode fiber 222 at multiple wavelengths near the peak absorption wavelength. A portion of the right-hand side of Equation 3 can calculated using McCumber theory to extract the peak value of the resonant absorption coefficient $\tilde{a}_r(\lambda)$, which is then normalized to a value of 1. Then the two unknowns, $\gamma_B/\gamma_A$ and $\alpha_r p$ (the fitting parameters), can be determined through a fitting procedure that involves measurements of $r(\lambda)$ and $\tilde{a}_r(\lambda)$ at the multiple wavelengths near the peak absorption wavelength.

In addition, when combined with the emission power spectral density $S(\lambda)$, which can be measured by an optical spectrum analyzer, the disclosed systems and methods for measuring an absorption coefficient of a doped optical fiber can be used to extract a full characterization of the resonant absorption coefficient $\alpha_r(\lambda)$ at all relevant wavelengths, not limited to the vicinity of the pump wavelength.

Figure 8:
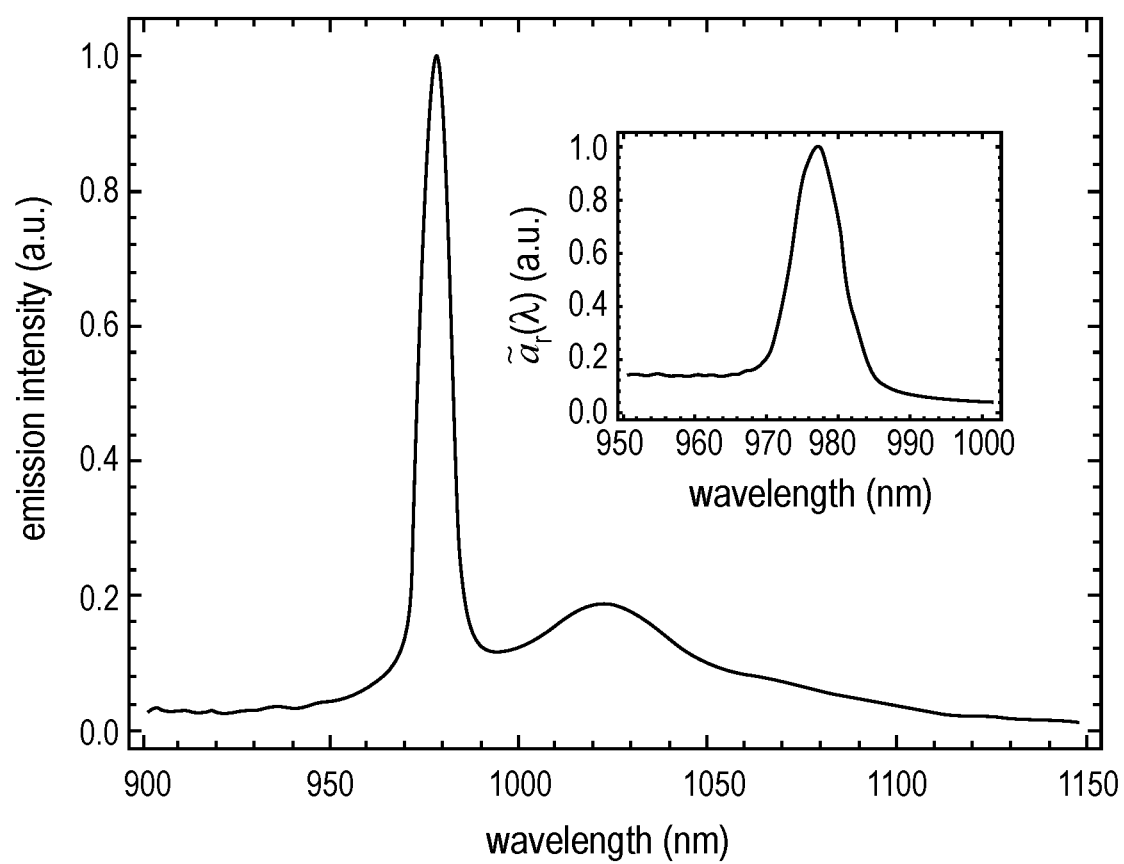
FIG. 8 depicts emission power spectral density versus wavelength.

FIG. 8 depicts emission power spectral density $S(\lambda)$, plotted in arbitrary units versus wavelength (in nanometers). The inset to FIG. 8 depicts the resonant absorption coefficient $\tilde{a}_r(\lambda)$, calculated using the McCumber theory, normalized to its peak value and plotted in arbitrary units.

For the fitting procedure, seven different pump wavelengths were chosen, near the absorption peak wavelength of the SM-YSF-LO-HP (a ytterbium-doped, single-mode, single-clad optical fiber also from Nufern, Inc.) doped optical fiber, by tuning the CW Ti:Sapphire laser. At each wavelength, the emission signal power was measured at points A and B over sufficient time windows until the desired signal-to-noise ratio was achieved. Seven independent measurements were performed at each wavelength to obtain the proper statistics and error-bars.

Figure 9:
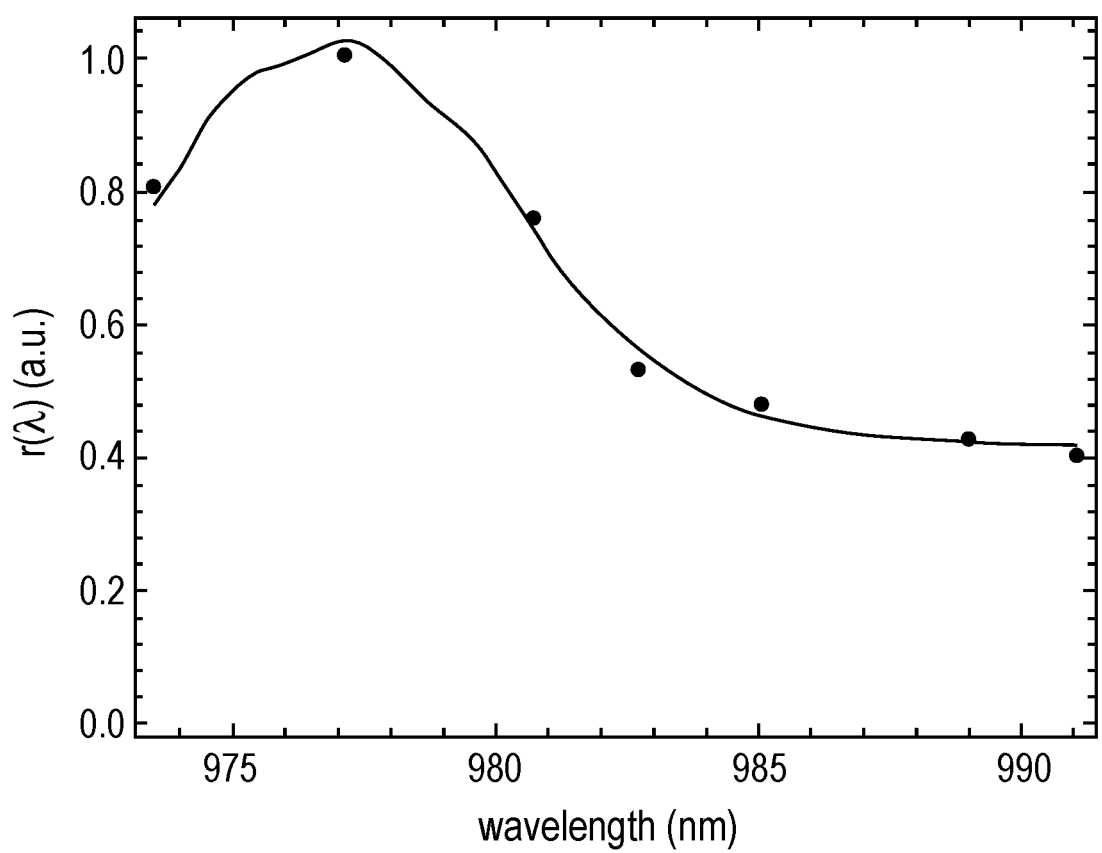
FIG. 9 depicts the natural log of the ratio of the collected emission signal power versus wavelength.

FIG. 9 depicts the natural log of the ratio of the collected emission signal power, $r(\lambda)$ versus wavelength (in nanometers), showing the seven independent measurements at the seven different pump wavelengths, as well as the fitted curve.

Values for $\alpha_r p$ are included for comparison purposes: side-light analysis, 0.198±0.008 centimeters$^{-1}$ ("cm$^{-1}$"); cutback method, 0.203 cm$^{-1}$; and vendor reported, 0.220±0.033 cm$^{-1}$. The value of $\gamma_B/\gamma_A$ was 0.69.

The comparison shows that the side-light analysis yields accurate results whose range includes the value for the cutback method, and whose range lies wholly within the range reported by the vendor. But in comparison to the cutback method, the side-light analysis is cheaper, easier, faster, and non-destructive.

The disclosed systems and methods for measuring an absorption coefficient of a doped optical fiber can be used to extract the peak value of the resonant absorption coefficient $\alpha_r(\lambda)$. However, when combined with the emission power spectral density $S(\lambda)$, which can be measured by an optical spectrum analyzer, the disclosed systems and methods for measuring an absorption coefficient of a doped optical fiber can be used to extract a full characterization of the resonant absorption coefficient $\alpha_r(\lambda)$ at all relevant wavelengths and is not limited to the vicinity of the pump wavelength.

Although examples have been shown and described in this specification and figures, it would be appreciated that changes can be made to the illustrated and/or described examples without departing from their principles and spirit, the scope of which is defined by the following claims and their equivalents.

What is claimed is:

1. A system for measuring an absorption coefficient of a doped optical fiber, the system comprising:
    a laser source configured to transmit laser light at a selectable wavelength;
    a single-mode optical fiber comprising an end configured to splice to the doped optical fiber;
    two or more multimode fibers at a side of the doped optical fiber, spaced apart along the side of the doped optical fiber, configured to collect spontaneous emissions from the side of the doped optical fiber; and
    a photodiode or power meter connected to the two or more multimode fibers.

2. The system of claim 1, further comprising:
    an optical chopper between the laser source and the single-mode optical fiber; and
    a lock-in amplifier connected to the photodiode;
    wherein the lock-in amplifier is referenced to an operating frequency of the optical chopper.

3. The system of claim 2, wherein the lock-in amplifier is referenced to the operating frequency of the optical chopper by connecting an output of the optical chopper to a reference frequency port of the lock-in amplifier.

4. The system of claim 1, further comprising:
    one or more polarizers between the laser source and the single-mode optical fiber.

5. The system of claim 1, further comprising:
    a beam splitter between the laser source and the single-mode optical fiber; and
    a power meter;
    wherein the beam splitter is configured to provide a portion of the laser light to the power meter.

6. The system of claim 1, further comprising:
    an optical element configured to couple the laser light into the single-mode optical fiber.

7. The system of claim 1, further comprising:
    a power meter configured to allow an operator to maximize power of the spontaneous emissions to the two or more multimode fibers.

8. The system of claim 1, wherein the photodiode comprises two or more photodiodes, and
    wherein each of the two or more photodiodes is connected to a respective one of the two or more multimode fibers.

9. The system of claim 1, wherein the single-mode optical fiber is a passive single-mode optical fiber.

10. The system of claim 1, wherein the doped optical fiber comprises a single-mode fiber, a multi-mode fiber, a large-mode-area fiber, a photonic crystal fiber, or a double-clad rare-earth-doped optical fiber.

11. The system of claim 1, wherein the doped optical fiber comprises a chalcogenide fiber, a silica fiber, or a ZBLAN ($ZrF_4$—$BaF_2$—$LaF_3$—$AlF_3$—$NaF$) fiber.

12. The system of claim 1, wherein the doped optical fiber comprises a fused silica fiber, a fused quartz fiber, a natural quartz fiber, an aluminate glass fiber, an aluminophosphate glass fiber, an aluminosilicate glass fiber, a borate glass fiber, a borogermanate glass fiber, a borophosphate glass fiber, a borosilicate glass fiber, a chalcogenide glass fiber, a fluoride glass fiber, a fluorophosphate glass fiber, a germanate glass fiber, a germanosilicate glass fiber, a halide glass fiber, a phosphate glass fiber, a phosphosilicate glass fiber, a silicate glass fiber, or a tellurite glass fiber.

13. A method for measuring an absorption coefficient of a doped optical fiber, the method comprising:
    collecting, from a side of the doped optical fiber, an emission spectrum using two or more multimode fibers; and
    calculating the absorption coefficient from using the emission spectrum and McCumber theory.

14. The method of claim 13, wherein the emission spectrum comprises spontaneous emissions from the side of the doped optical fiber.

15. The method of claim 13, wherein the two or more multimode fibers are at the side of the doped optical fiber, and
    wherein the two or more multimode fibers are spaced apart along the side of the doped optical fiber.

16. A method for measuring an absorption coefficient of a doped optical fiber, the method comprising:
    providing laser light from a laser source at a selectable wavelength;
    coupling the laser light to an end of a single-mode optical fiber that is spliced to the doped optical fiber;
    collecting, from a side of the doped optical fiber, an emission spectrum using two or more multimode fibers; and
    providing the collected emission spectrum to a photodiode or power meter.

17. The method of claim 16, further comprising:
    calculating the absorption coefficient form using the emission spectrum and McCumber theory.

18. The method of claim 16, wherein the collecting, from the side of the doped optical fiber, of the emission spectrum using the two or more multimode fibers comprises maximizing output power of the two or more multimode fibers by pumping the doped optical fiber at peak absorption wavelength.

19. The method of claim 16, further comprising:
    chopping the laser light using an optical chopper; and
    providing output of the photodiode to a lock-in amplifier;
    wherein the lock-in amplifier is referenced to an operating frequency of the optical chopper.

20. The method of claim 16, further comprising:
    controlling power of the laser light using one or more polarizers;
    wherein the controlling of the power of the laser light using the one or more polarizers comprises controlling the power of the laser light using first and second polarizers in series by adjusting a polarizing angle of the first polarizer relative to a polarizing angle of the second polarizer.

* * * * *